United States Patent [19]
Stevens

[11] Patent Number: 6,065,459
[45] Date of Patent: May 23, 2000

[54] CORRECT-A-FLOW RADIUS TURNAROUND ANTI-REVERSIONARY VENTURI PIPES

[75] Inventor: Gary E Stevens, Indianapolis, Ind.

[73] Assignee: Lynn Diane Johnston, Bloomington, Ind.

[21] Appl. No.: 08/856,722

[22] Filed: May 15, 1997

[51] Int. Cl.[7] .................................................. F02M 29/00
[52] U.S. Cl. ........................................................... 123/590
[58] Field of Search ............................. 123/590, 184.54, 123/316; 60/316, 324

[56] References Cited

U.S. PATENT DOCUMENTS

| | | | |
|---|---|---|---|
| 2,913,871 | 11/1959 | Bradshaw | 60/316 |
| 3,043,097 | 7/1962 | Inman et al. | 60/316 |
| 3,930,473 | 1/1976 | McFarland, Jr. | 123/184.34 |
| 4,333,441 | 6/1982 | Still et al. | 123/590 |
| 5,165,231 | 11/1992 | Rich | 60/316 |
| 5,282,361 | 2/1994 | Sung | 60/316 |
| 5,392,752 | 2/1995 | Brogan et al. | 123/591 |
| 5,572,979 | 11/1996 | Czadzeck | 123/590 |
| 5,662,077 | 9/1997 | Boswell | 123/590 |

FOREIGN PATENT DOCUMENTS

| | | | |
|---|---|---|---|
| 3640290 | 6/1988 | Germany | 60/316 |
| 717880 | 11/1954 | United Kingdom | 60/316 |

Primary Examiner—Erick R. Solis

[57] ABSTRACT

A sealed, high volume, high velocity, vented 180 degree radius turnaround anti-reversionary flow correcting filtering device with no moving parts for improving induction velocity comprised of 2 flared pipes forming a radius turnaround Venturi configuration wherein the head intake runner wall helps form the coaxial cylindrical air curtain, with a funneled restriction point, 2 vacuum points and mounting legs for positioning and creating turbulence streams, for installation in 4 stroke combustion engine ports of both round and non-round designs. This invention increases engine performance and efficiency, and decreases wasteful and atmospheric-polluting exhaust emissions. There have been no prior 180 degree turnaround, high velocity, high volume reversion filtering devices in use up to and through the 1998 motor vehicle year.

1 Claim, 2 Drawing Sheets

CORRECT-A-FLOW RADIUS TURNAROUND ANTI-REVERSIONARY VENTURI PIPES

CROSS-REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

The present invention relates generally to a device for correcting the reversionary flow gases improving induction velocity, engine performance and emission controls in 4 stroke combustion engines. More particularly the present invention relates to a mechanical device with no moving parts that quickly and efficiently filters and redirects the reversion form the intake fill charge using funnel and vacuum principles to form a coaxial cylindrical air curtain.

Automobile and truck engine exhaust pipes expel gases which are environmentally polluting and contain unused fuel. The heat and pressure from such sources are easily felt if you put your hand on the tailpipe of a vehicle while it is running. The major problem is that this pollution, heat, and pressure back up into the air intake of the engine when the intake valve opens because the pressure and heat are stronger than the atmospheric air pressure intake charge, and is easily overcome by it. Such heat, pressure, and pollution dilute the cold intake charge air trying to enter the combustion chamber. This is known as reversion. The problem is caused by exhaust air and air intake overlap which occurs when both valves are open at the same time. Another part of the problem is that this hot pressure wave, caused by the exhaust stroke of the engine, is hot enough to cause fuel dropout due to the cold, weak low pressure intake charge air front hitting the hot, high pressure exhaust reversion air front. Prior means for improving emissions controls and engine efficiency have not effectively focused on the filtration problem of the reversionary flow of combustion gases in the intake ports in any 4 stroke engine manufactured up to 1998. Thus the dilution of the intake charge has been universal.

The reversion must be caught where it is the strongest and easiest to control, and where it is catchable is on the wall where the pressure sends it. It must be collected as close to the valve bowl area as possible, or else the reversion will have already spread out and down the middle of the intake runner back through the mixing apparatus and even out the air cleaner.

BRIEF SUMMARY OF THE INVENTION

The Stevens device solves internal combustion engine performance and efficiency problems primarily by the creation of a device which provides the means for catching the reversionary gasses where they may be most advantageously caught, and, in effect, pushing and pulling them to create benefits. Elements of shape, restriction points, vacuum suction, along with a coaxial cylindrical air curtain and proper placement combine to solve the prior internal combustion engine problems, preventing waste and creating many advantages.

The reason this is possible, is because the air boundary layers which set-up on any vortex are weak in comparison to the main flow path of the air streams. This allows air to flow in 2 directions at the same time, up and down the vortex to fill the cylinder air space which will come to the edge of the valve in a high speed swirl for the air to travel back into the intake from the cylinder air pressure, and will be felt on the outside edge of the valve seat from the wall of the cylinder to the wall of the head's intake runner where the Stevens device catches the reversion and turns it around again, back into the cylinder before intake valve closure and ignition for the final time before the cycle is completed. It then starts again.

The present invention provides a fast, effective, inexpensive means for filtering reversionary gasses out of the intake flow fill stream under all operating conditions, and is easily adaptable to both new and used motor vehicle engines. The Stevens device catches the reversionary gasses as close to the bowl as is possible and it uses their energy for some of the advantages noted herein. This flow-correcting device incorporates an arrangement in which the intake runner wall is used to help form the reversionary pathway, which captures and redirects the engine's reversionary gases as a result of the shape and location of flared, Venturi metal pipes which create a re-directional, sealed, 180 degree, reversionary turn around pathway, also called the radius turnaround to the intake valve instead of to the carburetor or fuel injector.

With the 180 degree turnaround wall, at the beginning of the head port sending high pressure exhaust gasses back in the correct direction toward the piston as a result of the application of funnel and vacuum principles, the configuration of this device actually creates a coaxial cylindrical air curtain through which gasses are pushed and pulled. Simply stated, the use of the Stevens filtering device provides a black hole vacuum trap for a reversionary pathway that catches the reversion and controls it.

The general advantages achieved by using the Stevens' Correct-A-Flow high velocity 180 degree Radius Turnaround Anti-Reversionary Venturi Pipes, are better gas mileage, more power, quicker throttle response, and a colder running engine since the exhaust is kept in the head where water jackets can cool it. Intakes don't have water jackets. These pipes are relatively small and weigh little and can easily be manufactured with mounting legs at a stamping plant. These Stevens devices can easily be retrofitted or installed at the time vehicles are assembled, and this device is especially advantageous for both markets because any certified mechanic can quickly do a stock installation with no special tool or training being necessary. The immediately discernible result is increased power and gas mileage. The cost of this device is quickly recouped from savings on fuel alone. The universal usage of the Stevens device should result in a worldwide savings of vehicle fuel and better environmentally related health for mankind. One specific way power gain occurs is when, in light of the ratio between a 4 inch bore piston moving up in its bore one inch, before the 2 inch intake valve closes, the air will be traveling 4 times the speed of the piston going back through the open intake valve under pressure to the valve bowl and then into the intake head runner wall to the black hole vacuum point where the Stevens device picks it up, resulting in increased power.

There are other advantages and benefits as well. For example, sound energy is normally wasted in the engine, but with the Stevens device it is used to help build power. The Stevens device is more compatible to the handling of sound waves in the exhaust gas reversion signal and turning them around more quickly and smoothly. By using sound energy to help clean the intake charge and send it back out of the exhaust pipe, the noise level of the engine is also lower.

Added horsepower can't be achieved cheaper on a given engine, and blower and belts won't wear out as frequently, nor will the turbo bearings seize-up. The Stevens' device has no moving parts yet produces a horsepower gain with no loss of energy drawn from the engine.

In essence the device provides a vacuum catch and trap pipe to collect and filter out the reversion before it can disperse throughout the intake manifold, and sends its catch back through the intake valve quickly enough to exit the still open exhaust valve, and this action of pushing the main fill flow stream forward increases its speed. This device also functions to keep the air from the air cleaner to the intake valve flowing in one continuous stream, and to suck the main fill flow stream forward to the intake valve causing a stronger vacuum signal at the air cleaner of the mixing device, and again increasing the main fill flow speed, creating multiple performance and efficiency advantages.

Since the Stevens device turns around the newly cleaned, most oxygenated part of the air intake charge, the last part, which is the part that is usually pushed back up into the intake for the next cycle, the device pushes it back into the cylinder with gas and air before the intake valve can close for a tighter explosion, thus the invention is actually functioning as a small supercharger when turning around the now fresh air gas mixture being pushed back through the intake valve as the piston moves up in the bore on the compression stroke, and then turning it back again at the 180 degree turnaround to speed up the fill velocity which is packing the cylinder before the intake valve can close for a power gain. Any air rammed into the device will gain speed at the 180 degree turnaround and have power and speed enough to increase the intake charge velocity to push more air into the cylinder before the piston moves one inch up in the bore on the compression stroke for a power gain as the engine piston mildly supercharges the engine. Two inches up on the piston would be preferred, so use a longer stroke engine for best results of this benefit.

These energy sources are otherwise being wasted by the engine manufacturers of the world when they could be giving more zip to vehicles from city block to city block with a new source of inexpensive and heretofore unused power. This greatly benefits out put, and is another advantage of the present invention.

The Stevens device much improves and slightly pressurizes the cylinder fill charge which results in a much higher cylinder pressure on the low r.p.m. ranges for a much better torque curve, and thus less throttle is required to move the vehicle every time it begins to move. Another benefit of interest is that the Stevens device won't wear out or wear off, as do catalytic converters, etc. It also functions as a cylinder packer, packing it with as much fresh air and gas as possible without the extra moving parts that blowers and turbochargers require.

Many blower explosions occur when racing cars backfire on top end as a result of the engine going lean. Because the top of the piston gets so red hot, it provides ignition to the intake charge before the intake valve is closed, sending fire and exhaust violently throughout the intake manifold. This often blows the blower 10 feet in the air, if the race teams don't have a blower tie down wrapped over the blower to prevent it. The Stevens device will keep the top of the piston wetter, and thus cooler to help stop such lean out, and in the case of remaining lean out, it will turn the high pressure wave back into the cylinder for less overall damage to the engine. The Stevens device will catch the most damaging part of the backfire forces, relieving the pressure on the blower walls by sending the explosions into the cylinder where the walls are built to take the explosive force. Additionally, the Stevens device helps engines hold a smoother, stronger, lower r.p.m. range while idling to save gas with less explosions using the gas, and it also develops higher torque at the lower r.p.m. ranges of the engine by the better filling of the cylinder before the explosions.

These and other objects and advantages of the present device will become apparent to those skilled in the art after considering the following detailed specifications in conjunction with the accompanying drawings.

DETAILED DESCRIPTION OF THE INVENTION

Reference Number (1) represents the exhaust port of a 4 stroke combustion engine. Reference Number (2) represents the exhaust valve. Reference Number 3 represents the intake port, which side uses these Venturi pipes FIG. 3 away from the intake valve, (4). Reference Number (4) represents the intake valve. Reference Number (5) represents the gasket of Teflon™ or similar compound. Reference Number (6) represents the intake manifold. Reference Number (7) represents the larger longer flared pipe needed to form the radius turnaround. Reference Number (8) represents the 3 mounting legs which will need to be stamped out 120 degrees apart for correct positioning to secure the device in the intake runner of the head, creating the 3 turbulence streams at 120 degrees angles. Reference Number (9) represents the short flared pipe which forms the Venturi radius directional plates. Reference Number (10) represents the spot weld attachment of the short flared pipe (9) to the long flared pipe (7) to make one piece installation. Reference Number (11) represents the black hole vacuum pathway first caused by the main vacuum set-up point. Reference Number (12) is the 180 degree turnaround. Reference Number (13) is the return pathway of the reversion and to the combustion chamber. Reference Number (14) is the main vacuum set-up point caused by the seal and restriction at (16) to catch the reversion and compressed gasses at (15). Reference Number (15) is the secondary vacuum point caused by the vacuum draw at (14) and is referred to herein as the black hole vacuum point where reversion gasses are caught. Reference Number (16) is the intake passage restriction caused by the small flared pipe that creates a super strong vacuum at (14) which make it a Venturi configuration. Reference Number (17) is the main flow fill stream.

Firstly, to clarify and distinguish, it should be noted that the only wall that is available for effectively trapping the reversion is the head or intake wall. This wall has long been used for a number of other types of intake flowing improvement apparatuses. The prior art of Brogan, Patent No. 5392-752, used the same wall, and all Brogan would have to do, is to drill his wall, at his Reference 21, and 22, in order to have a device that would work as good or better than Boswell's invention. McFarland, Jr.'s Patent No. 3930-473, used the same intake runner wall to catch some reversion and turn it around. The Stevens device, FIG. 4, doesn't counter act reversion like Boswell, but instead uses it for power, because it provides a good power benefit, if used correctly. Secondly, none of the inventors' prior means of dealing with the reversion problem have approached the problem through filtration of the reversion from the intake charge in conjunction with funnel restriction and vacuum draws to push and pull the gasses with coaxial cylindrical air columns, and this distinguishes the Stevens device dramatically.

Figure 3:
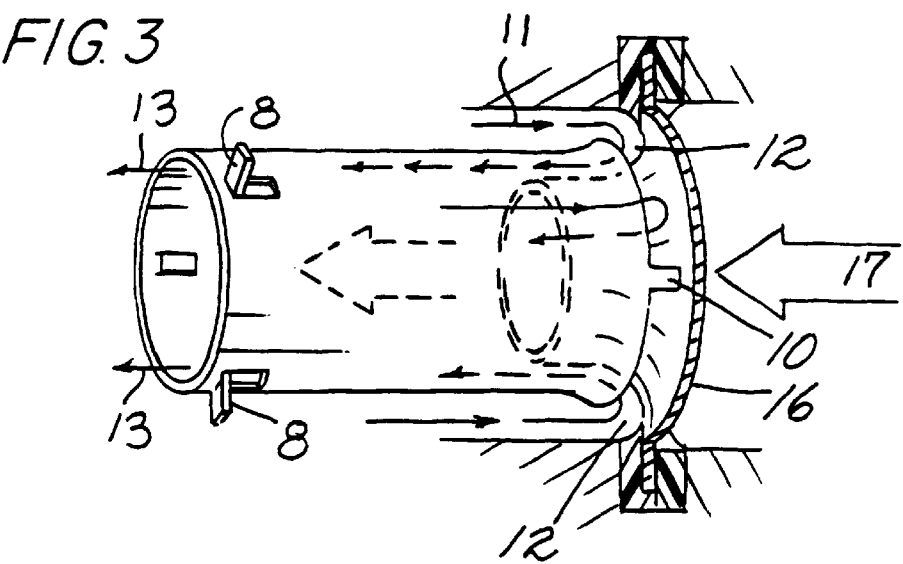
FIG. 3 is a diagrammatic perspective view of the present invention.
Figure 4:
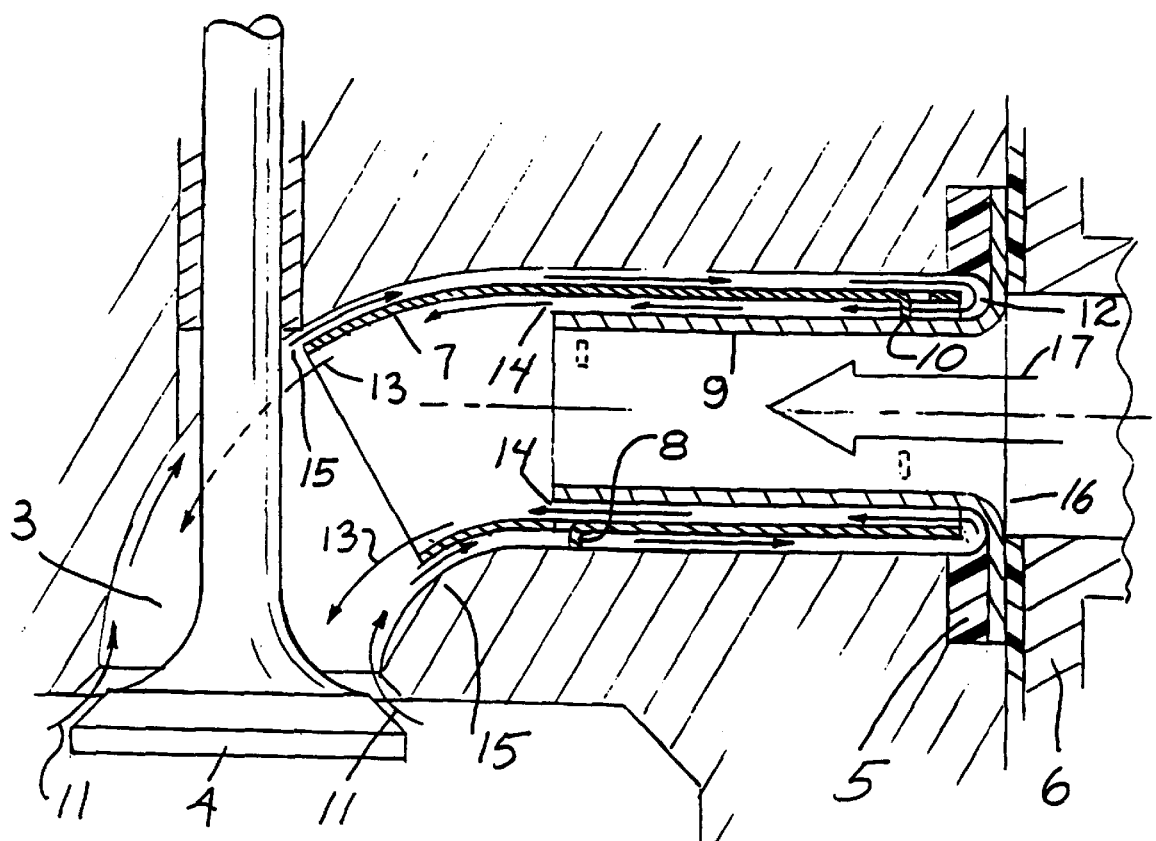
FIG. 4 is a diagrammatic view of the invention in the head intake runner of an engine showing the new reversional path.
Figure 5:
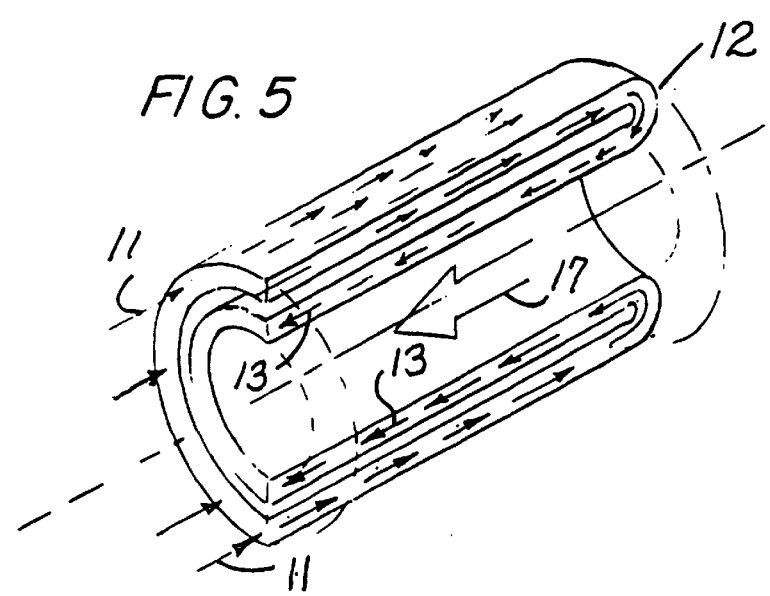
FIG. 5 is a perspective view of the insection of the coaxial inlet and return air pattern created by the present invention, also referred to herein as the cylindrical air curtain.

With the Stevens device, FIG. 4, in the head of the engine, the intake runner is no longer the intake runner in the engine, the device, FIG. 3, is the intake runner, the short flared pipe, (9) and the long flared pipe, (7), are the intake runner of the engine, the old intake runner is used and converted to the radius turnaround, (12).

The Correct-A-Flow Radius Turnaround Anti-Reversionary Venturi Pipes invention is an anti-reversionary, high velocity, high volume filter device, FIG. 3, that deals effectively with backward flowing gasses in the intake fill flow stream, (17), from the air cleaner to the top of the piston in the normally aspirated engines, by taking some simple aluminum or stainless steel stamping shaped into one long flared pipe, (7), attached at (10) over the nose of one short flared pipe, (9), laminated to a Teflon™ gasket, (5), at the flare, for a perfect air tight seal to insure a strong vacuum signal, creating a black hole, high volume vacuum point at (15), when the intake charge is sped up going over the small flared pipe's flare restriction point, (16), at the beginning of the head's intake runner, which creates a Venturi configuration causing a super strong suction at (14) insuring a strong vacuum draw at (15), the other end of the sealed reversional pathway to create a path of least resistance of the reversional gasses that shoot to the valve bowl walls and down the head intake runner walls to the 180 degree turnaround, (12), when the intake valve, (4), first opens as the higher exhaust cylinder pressure, caused by the intake exhaust overlap, overcomes the weaker, normally aspirated fuel fill charge, (17), being drawn into the engine as the piston starts down on the intake stroke creating a vacuum through the mixing device, the carburetor for instances, drawing liquid gas into the air stream, automatizing the gas, on the way to the piston, now being sped up by the energetic, faster flowing reversional gasses shooting out of the reversional coaxial unrestricted return pathway, (14), under greater pressure, pushing any air in front of it and pulling any air behind it into the cylinder quickly enough to allow most of the reversion to be then scavenged form the cylinder before the exhaust valve, (2), can close, cleaning the burned reversional gasses from the cylinder fill charge before the piston comes up on the compression stroke pushing some of the now cleaner fill charge back through the intake valve, (4), then through the device, FIG. 4, again, and then though the intake valve, (4), one more time, before it can close, packing the cylinder with a high velocity, higher pressure and cleaner fill-charge, for much higher cylinder pressure before the ignition source explodes the now better controlled, more oxygenated and fresher gas air mixture that will now burn more completely with much less unburned residue and pollution problems for our world as overall improvement to engine performance rewards those who would use the Stevens device with much pleasure from the quicker, more responsive engine.

The device, FIG. 3, uses the inside diameter of the induction pipe in the head for a close mounting to the combustion chamber and for forming the outside diameter while the device's outside diameter forms the inside diameter of the return pathway back to the sealed, high volume, high speed, vented 180 degree, turnaround, (12), which also forms the Venturi restriction speed up point, laminated between the induction pipe and the head intake seal it forms with its Teflon™ coated gasket, (5), material to insure no leakage and provides a much greater vacuum signal toward the intake valve, (4), and from the intake valve, (4), from the device, FIG. 4, as the intake charge moves over the Venturi restriction point, (16), as the piston starts down on the intake stroke to cause a vacuum draw, (14), at the 180 degree vent funneled restriction point, (16), formed by the short flared pipe, (9), of the device being positioned in the long flared pipe, (7), so as to form a restrictive funnel and a 360 degree vent, (14), minus the 3 dimple spot welds, (10), that tie the 2 stampings together which vent (14) insures a strong vacuum signal, (15), at the beginning of the long flared pipe, (7), black hole vacuum point, (15) of least resistance positioned as near the intake valve bowl as physically possible and this insures that the greatest velocity and volume of reversion is picked up and that the least amount of intake fill charge will be picked up with the reversion and passed back up the new pipe line created by the device's 180 degree turnaround, high velocity vent perfectly aligned via the three mounting legs, (8), with the fill flow stream shooting out into the fill charge flow stream faster than anything moving in front of it or behind it, pushing anything in front of it into the cylinder and pulling anything behind it quickly into the cylinder and back out the exhaust valve, (2) while it is still open to clean most of the reversion from the engine before the exhaust valve, (2), closes, thus the 180 degree radius turnaround, (12), by use of coaxial cylindrical curtains of air in conjunction with vacuum points, and a funneled, Venturi restriction point make the Stevens device, FIG. 3, effective, fast and powerful filter.

The reason this all happens with the intake charge traveling in two different directions, is because the air at the valve is swirling like a mini tornado and in between the twists of the tornado are weak flow paths called boundary air paths. These can be overcome by pressure in order to allow air flow in the other direction too, giving a natural pathway for the pressure wave that comes off the top of, for example, a four inch piston in the internal combustion engine.

Air has very high speed capabilities and can move in 2 directions at the same time because of boundary air effect which is air that is on the edge of high speed moving air streams. The boundary air paths are weak opposed to the main flow streams, and back pressure can overcome them for reverse travel up and down and around them without shutting off the main flow stream which is actually venting and allowing better air flow velocity. This is the same principle under which air vents the water going down a drain, breaking the drag trail vacuum.

The reason the reversion can be caught by the Stevens' device, FIG. 4, is because pressure seeks out the head intake runner wall and moves down the wall where it can be caught at vacuum point, (11), and turned around at the 180 degree radius, (12), and discharged at vacuum point, (13), into, (3), the main intake pathway. By catching and turning the hottest most powerful part of the reversion pulse back into the head, a beneficial reversionary wall is created and used which also stops the weaker, later trailing reversionary gases. Once the reversionary combustion gases are headed in the right direction, there is a stronger intake signal to the combustion chamber pushing backward any reversion left coming toward the intake manifold, (6). The normal reversionary force goes against the chamber walls and in the direction of the least restriction, toward atmospheric pressure all the way to the carburetor and out the air cleaner. By vacuum trapping and giving the reversionary gases a way out, back in the correct direction toward the intake valve, (4), and cylinder and then through the exhaust valve (3), the high velocity air speed which the exhaust gas has over atmospheric pressure, promotes, rather than hinders, improved filing of the cylinder. This gives higher cylinder pressure before the next explosion thus, more torque. The cylinder fills with more fresh, cooler air as the first part of the reversionary pulse turns around in the 180 degree high velocity radius turnaround, (12), and goes back to the cylinder, (13), out the exhaust valve still in the scavenge mode, (2), before it can close, and in the process the intake charge air which is traveling at a much faster rate on the low r.p.m. range of the engine, has a ram air effect for better filling of the cylinder. A faster rate of fill and fresh air means more low end torque. More oxygen and more cylinder pressure always help the low end torque factor. It will take less opening of the throttle to do the same work with much less gas usage. Better emissions control is achieved by turning the reversion pulse before it can enter the intake manifold, (6), where it normally pollutes and dilutes the intake air with the hot and inefficiently burned exhaust gases. By turning the exhaust gas around, the benefit of the speed with which the exhaust gas is traveling is gained which helps bring the slow intake charge air into the engine faster, rather than hindering it and pushing it backwards all the way to the carburetor or fuel injector. This device, FIG. 4, decreases fuel drop out caused by the hotter more powerful exhaust gases hitting the cold weak intake charge air head on and dominating it.

The Stevens' device sends the reversion past the piston out the exhaust valve, (2), cleaning the powerful main surge of reversion from the engine, decreasing fuel drop out caused by the power of the main surge of the hot pressure reversional gasses dominating the weaker, cooler atmospheric intake charge. It is the same principle that happens in weather systems to cause rain, but in engines it causes usable fuel to drop out of suspension.

The exhaust valve closes after its last scavenger draw and the intake charge on top of the piston hits the closed exhaust valve, (2), and must then exit the open intake valve, (4), until it closes. This speeds up the back pressure waves velocity faster and faster until intake valve closes right before compression and ignition, and right before the intake valve, (4), closed this freshly oxygenated air gas mixture is turned around and sent back to the top of the piston by use of the Stevens device's 180 degree turnaround, (12), which allows more air and gas to make it back into the cylinder past the intake valve, (4), before it closes. This feature allows the engine to make more power on the high r.m.p. ranges and also to make more power when the engine usually would be running out of air without the Stevens device.

The Stevens device, FIG. 3, does have a restriction, (16), in it so the Venturi will work, because that is how Venturis work, they restrict the air flows, funnel them down into a cone, then go back up into a larger size creating a Venturi restriction, and the Stevens device creates a black hole vacuum point, (15) at the beginning of the long flared pipe to give suction there and pull the reversion back through the device which would normally go back up in the intake, (3), willy-nilly.

There is a vacuum at (15) and (14) created by air flow on the short-flared pipe going by (14), creating a suction at (15) to gobble up the reversion pulse and the compression pulse for supercharging explosive gasses from any explosion going outward. The black hole vacuum point, (15), is going to give the reversion that blows against the wall, the path of least resistance because a vacuum is definitely easier to flow something into, than something blowing at it is. Thus an easily accessible vacuum point is going to be taken every time because pressure goes to the vacuum to satisfy the vacuum. Therefore the reversion isn't going down the center where the air is coming in from the intake charge from the piston going down, rather it is taking the path of least resistance when the Stevens device, FIG. 3, is in place, FIG. 4.

One way the Stevens device, FIG. 3, is used to increase horsepower is by the supercharging effect of the now cleaner over-the-piston intake charge being pushed back into the intake runners of the head itself after the exhaust valve, (2), is closed. As a result of the Stevens device, FIG. 4, the piston going up, creates a high pressure back flow in the intake until the intake valve, (4), is closed. This high pressure wave will be on the walls of the Stevens device, FIG. 4 which catches it and turns it around quickly before the intake valve, (4), can close, thus sending a high pressure fill-charge into the chamber before compression and ignition for a much stronger explosion due to the cleaner packed intake charge. It should be noted that as in supercharged engines, the compression ratios may need to be dropped to make full use of this device, FIG. 4. It should also be noted that the longer the stroke of the engine, the better the device, FIG. 4, will function, due to the longer time period the exhaust valve, (2), can be closed ahead of the intake valve, (4).

The Stevens device (FIG. 3) will not require a camshaft design change to work, but would allow a wilder camshaft design to be used in normally aspirated racing engines and would make a motor with a wild camshaft already in it seem much milder, but still race great. In some cases, the racer might even want to cam for more reversion pressure by opening the intake valve, (4) a little sooner for more low end torque. The intake valve, (4), needs to close with a steeper cam lobe too, in order to allow the piston to travel as high up in the cylinder bore before valve closure as is possible, while still allowing time to build up high cylinder pressure after closure for needed torque. The correct cam selection of a given stroke engine, with a fairly quick slope to the exhaust lobe of the camshaft to allow the exhaust valve, (2), to suddenly close as quickly as possible without damage to the valve train, will give more time to build up to the supercharging effect of the Stevens' device. Also valve trimming is critical to optimal engine output, and it is able to enhance the efficiency of the Stevens device.

The manufacturing of the Stevens device, FIG. 3, only requires a small amount of sheet metal, a gasket, welding materials and sheet metal stamping equipment. Two flared pipes, (7), (9), compose the device for the simplest method of manufacturing. One short (9), and one long (7) flared pipe. The short flared radius (9) must always be a little higher than the long pipe (7) to insure a good Venturi effect. These anti-reversionary devices, FIG. 3, should be made of stainless steel or aluminum and should be manufactured efficiently from sheet metal at a stamping plant to fit snugly the various engine sizes and port shape designs as ports are not the same from manufacturer to manufacturer. The easiest engines to build these devices, FIG. 3, for will be round port engines. The square port engines, or otherwise non-round port engines will be a little more complex to manufacture due to the corners, but nevertheless they will stamp out into a flare just as the round pipe does for mass manufacturing. The long pipe (7) will have 3 front mounting legs (8) 120 degrees apart that can be ground to fit the various port shapes the best. These devices, FIG. 3, should be built of as thin a metal as possible for maximum runner size and ease of manufacturing. The thinner metal will be easier to flare out and laminate with the intake gasket material (5), Teflon™ or the like synthetic fluorine-containing resin coating resistant to engine combustion temperatures. This will allow for easy installation of the devices, FIG. 3, in the head intake ports, (3).

Figure 1:
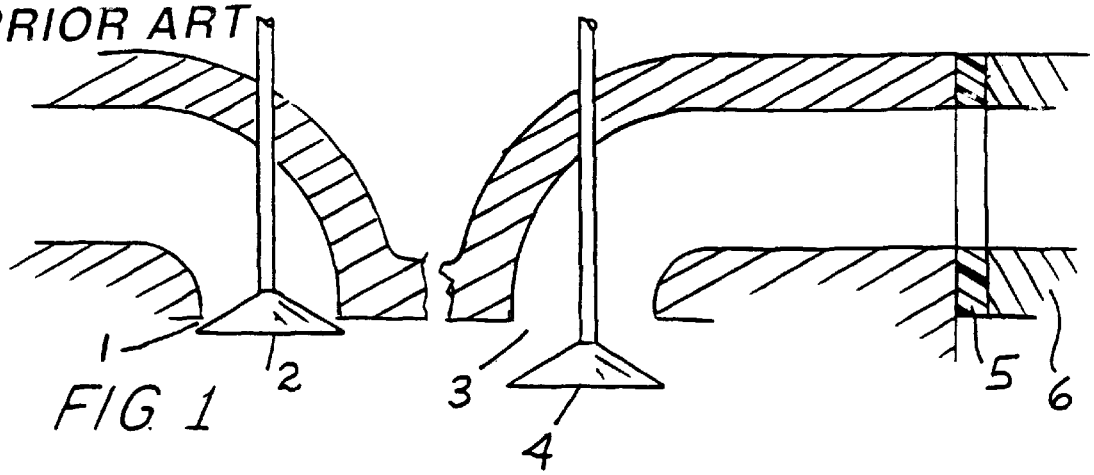
FIG. 1 is a diagrammatic view of a basic engine head structure, and is prior art.
Figure 2:
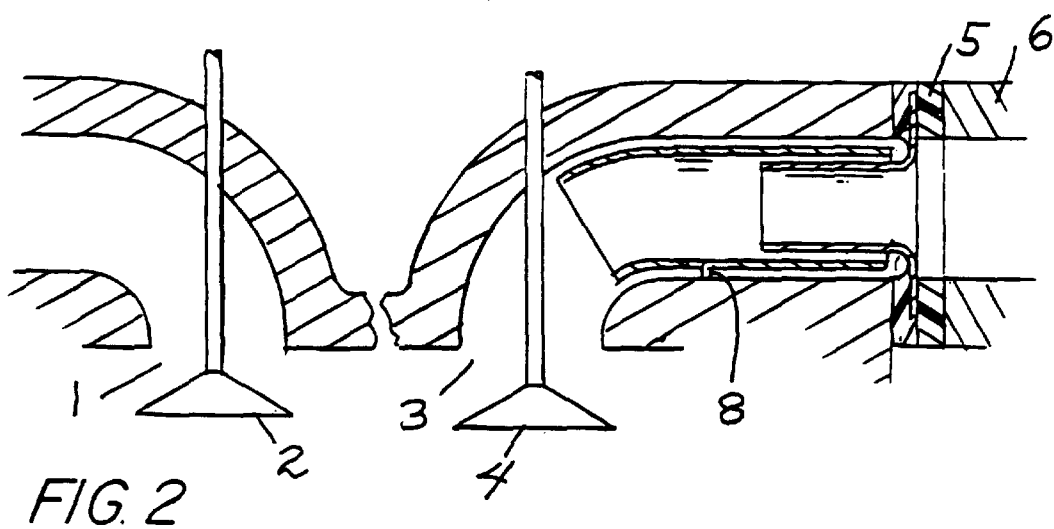
FIG. 2 is a view similar to FIG. 1 with a diagrammatic illustration of the present invention mounted in the intake chamber.

For installation of the anti-reversionary pipe, FIG. 3, in the intake port (3) close to the engine head, FIG. 1, all the mechanic will do, on stock installations, is take the intake manifold, (6), off and install the new intake gasket, (5), with the anti-reversionary pipes, FIG. 3 attached to it, and reinstall the intake manifold (6) so the vent will be at the beginning of the head's intake runner. The purpose of the legs Reference Number (8), is to position the device dead center in the port, (3). The Stevens device's small Venturi pipes, FIG. 3, go 2 to 3 inches into the intake port, (3), of the head and $1/8$ to $1/64$ of an inch from the head intake valve runner wall.

While there has been indicated a preferred embodiment of the Stevens' Correct-A-Flow Anti-Reversionary Radius Turnaround Venturi Pipes, FIG. 3, it is understood that variations can be made by those skilled in the art without departing from the invention. The invention is defined in the following claim:

What is claimed is
1. In an internal combustion engine:
a high velocity, high volume trapping, filtering, and controlling mechanical device producing a coaxial cylindrical air curtain causing an approximately 180 degree radius turnaround of reversionary combustion gasses from the induction charge of four stroke engines, the engine and head of said engine including the charge mixing device, a sealed induction pipe articulating the combustion chamber with said mixing device, said induction pipe providing a pathway for the fuel charge to enter through the head down into the combustion chamber from the mixing device and vice versa when intake exhaust valve overlap allows a hot exhaust reversion stream to move the opposite way back up through the intake valve, said device comprising, in combination:
a small flared pipe;
a larger longer flared pipe sized to fit within the intake port with a small clearance from the intake runner wall of said cylinder head;
attaching points circumferentially spaced apart joining the short flared and long flared pipes together;
said small flared pipe being received within the large flared pipe in such a manner as to create a flow path for redirecting the reversionary flow by approximately 180 degrees; and
mounting legs circumferentially spaced apart on the longer pipe.

* * * * *